United States Patent [19]

Wells et al.

[11] 4,026,988
[45] May 31, 1977

[54] SELECTIVE EXTRACTION OF MOLYBDENUM FROM ACIDIC LEACH LIQUORS

[75] Inventors: Barry A. Wells; Don Richard Clark, both of Centerville, Utah

[73] Assignee: Kennecott Copper Corporation, New York, N.Y.

[22] Filed: Dec. 22, 1975

[21] Appl. No.: 642,689

[52] U.S. Cl. .................................. 423/54; 423/24; 423/87; 423/89; 423/139; 75/101 BE
[51] Int. Cl.$^2$ ........................................ C01G 39/00
[58] Field of Search .................. 423/54, 24, 87, 89, 423/139, 658.5; 75/101 BE

[56] References Cited

UNITED STATES PATENTS

| 3,224,873 | 12/1965 | Swanson | 75/101 BE |
| 3,415,616 | 12/1968 | Agess et al. | 423/54 |
| 3,449,066 | 6/1969 | Swanson | 423/54 |
| 3,674,464 | 7/1972 | Chiola et al. | 75/101 BE |
| 3,725,046 | 4/1973 | Hartlage | 75/101 BE |

*Primary Examiner*—Herbert T. Carter

*Attorney, Agent, or Firm*—Mallinckrodt & Mallinckrodt

[57] ABSTRACT

Molybdenum is selectively extracted from an aqueous solution containing various other metal values, e.g. copper, arsenic, iron, bismuth, antimony, tin, and lead in addition to molybdenum. The molybdenum-bearing solution is adjusted to a pH of about 2.0 or less, and, then, intimately contacted with an organic extracting solution containing an alpha-hydroxy oxime. The loaded organic phase, containing extracted molybdenum values, is separated from the aqueous raffinate, and the molybdenum values contained in the organic phase are stripped therefrom using an aqueous stripping solution containing ammonium hydroxide. The efficiency with which the molybdenum is stripped from the loaded organic solution is poor unless nonylphenol is present in the organic solution as it is being stripped. The nonylphenol can be added to the system anytime prior to the ammonium hydroxide stripping step, e.g. it can be added to the organic solution before the extraction step, or it can be added to the aqueous-organic mixture during the extraction step (in which case it reports to the organic phase), or it can be added to the organic solution just prior to the stripping step.

10 Claims, No Drawings

SELECTIVE EXTRACTION OF MOLYBDENUM FROM ACIDIC LEACH LIQUORS

BACKGROUND OF THE INVENTION

1. FIELD

The invention relates to processes for extracting molybdenum values from aqueous solutions thereof, and in particular to selectively extracting molybdenum values from solutions which contain other dissolved metal values in addition to the molybdenum values.

2. STATE OF THE ART

Molybdenum values can be recovered from aqueous solutions thereof using organic solvent solutions of various amines and quaternary ammonium compounds to extract the molybdenum values from the aqueous phase.

In U.S. Pat. No. 3,449,066, a process is disclosed for extracting molybdenum values from aqueous solutions using a liquid organic medium containing alpha-hydroxy oxime as the extracting agent. As indicated in that patent, the extracted molybdenum values can be, at best, only partially stripped from the loaded organic phase with an aqueous ammonium hydroxide stripping solution. In U.S. Pat. Nos. 3,224,873; 3,440,036; and 3,455,680, it is taught that copper is also extracted from aqueous solutions by organic solutions containing alpha-hydroxy oxime, and U.S. Pat. No. 3,761,249 indicated that cobalt, nickel, and other metal values, if present, will also be extracted from the aqueous solution by such alpha-hydroxy oxime extracting solutions.

According to the teachings of U.S. Pat. No. 3,674,464, copper can be selectively extracted from aqueous solutions containing molybdenum and copper values by treating the aqueous solution with an organic solution containing alpha-hydroxy oxime at a pH above 5.7, preferable 6.9 to 9.6. It is further taught in U.S. Pat. No. 3,761,249, that copper values can be selectively extracted from solutions containing nickel and cobalt values in addition to the copper values by contracting the aqueous solution at pH of between 6.5 and 8.5 with an organic extracting solution containing alpha-hydroxy oxime.

In U.S. Pat. No. 3,725,046, a process is disclosed for extraction of copper values from aqueous solutions thereof using an organic extractant solution containing 8 hydroxy quinoline. It is taught that the presence of an alkylated phenol such as nonylphenol in the organic extraction promotes a substantial increase in efficiency of stripping copper values from the loaded organic phase using an aqueous, acidic solution as the stripping agent.

SUMMARY OF THE INVENTION

In accordance with the invention, molybdenum values are selectively recovered in exceptionally high yields form aqueous solutions containing, in addition to molybdenum, at least one other dissolved metal selected from the group consisting of arsenic, bismuth, copper, iron, antimony, tin, and lead. The pH of each of the aqueous solutions is first adjusted to about 2.0 or less, and the solutions are then intimately contacted with an organic extracing solution which contains a sufficient amount of alph-hydroxy oxime to selectively extract essentially all the molybdenum values from the aqueous solution. Extraction of 99% of the molybdenum is obtained with essentially complete rejection of any other metal values in the aqueous solution.

The loaded organic extracting solution is then separated from the aqueous raffinate, and the molybdenum values are stripped from the organic solution using an aqueous stripping solution containing ammonium hydroxide. It has been found that the ordinarily poor efficiency with which the molybdenum is stripped from the organic solution using an aqueous ammonium hydroxide solution can be greatly increased by having nonylphenol present in the loaded organic solution as it is being stripped. The nonylphenol can be added to the organic extracting solution at any time prior to the stripping step. For example, the nonylphenol can be added to the loaded organic phase which has been separated from the aqueous raffinate, or it can be added to the organic extracting solution prior to the extraction of molybdenum from the aqueous solution. Further, the nonylphenol can be added to the mixed phases during the extraction of the molybdenum from the aqueous solution, whereby the nonylphenol reports to the organic portion of the mixed phases.

It has also been found advantageous to subject the molybdenum-bearing, aqueous solution to an oxidation treatment prior to the extraction of the molybdenum values therefrom. Molybdenum species which are present in the aqueous solution in a lower oxidation state, e.g. 2 or 3, tend to form emulsion products at the interface between the aqueous and organic phases, thereby reducing the efficiency of the extraction. Oxidation of such molybdenum species prior to the extraction step averts the formation of the emulsion products, and the maximum extraction efficiency is thereby obtained. The oxidation is accomplished by treating the molybdenum-bearing, aqueous solution with an oxidizing agent such as chlorine or hydrogen peroxide.

DETAILED DESCRIPTION OF THE BEST MODE CONTEMPLATED

In accordance with the invention molybdenum values are selectively recovered in exceptionally high yields from aqueous molybdenum-bearing solutions which contain, in addition to molybdenum, one or more of the metal values including copper, arsenic, bismuth, iron, antimony, tin, and lead. The pH of the aqueous solution is adjusted to a value of 2.0 or less, and the solution is then intimately contacted with an organic extractant solution containing an alpha-hydroxy oxime.

The alpah-hydroxy oximes useful in the practice of this invention are described in U.S. Pat. Nos. 3,224,873 and 3,449,066. The descriptions and the methods of preparing such oximes as recited in those patents are incorporated herein by reference. In general, these oximes have the following idealized structural formula:

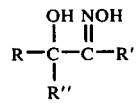

where R, R', and R'' are aliphatic and/or alkylaryl groups. Preferably they are straight or branched chain alkyl groups of 1 to about 14 carbon atoms.

In addition to the alpha-hydroxy oximes, the organic extractant solution comprises a liquid hydrocarbon solvent. The solvent must be substantially water immiscible and be capable of dissolving a sufficient amount of the alpha-hydroxy oxime to selectively extract molybdenum from the aqueous solutions. The oxime should be present in an amount of from about 2% to about 50% by volume based on the hydrocarbon solvent. Examples of suitable hydrocarbon solvents include isooctane, kerosene, naphthenic hydrocarbon solvents, benzene, toluene, xylene, isodecane, fuel oils, mineral oils, hexane, heptane, octane, and petroleum aromatic solvents.

The ratio of the volume of the organic extractant solution to aqueous solution used in extraction can vary widely depending on the concentration, conditions, etc. This ratio will generally be in the range of organic to aqueous of about 1:10 to 10:1. The ratio of organic to aqueous and the concentration of the alpha-hydroxy oxime will, of course, be adjusted so that essentially all the molybdenum values are transferred from the aqueous solution to the organic extractant solution during the contacting, e.g. extracting step, thereby leaving a molybdenum-barren aqueous solution. The extraction can be carried out at various temperatures and pressures. The only restriction being that both the organic and aqueous phases must remain liquid, otherwise pressures and temperatures are not critical.

The contact time between the aqueous and organic phases will also vary depending upon the concentration, condition, etc. Generally, contact times of from about 2 to 20 minutes or more are sufficient. Usually, a contact time of between about 2 and 5 minutes will be all that is required to extract essentially all the molybdenum from the aqueous solution.

Following the contacting step, the organic extractant phase is separated from the raffinate, i.e. the molybdenum-barren-aqueous solution. The separation can be made by decantation, the use of separatory funnels, and the like. The molybdenum values are then stripped from the loaded organic solution with an aqueous stripping solution containing ammonium hydroxide. It has been found that essentially all the molybdenum values contained in the loaded organic solution can be stripped therefrom, i.e. transferred to the aqueous stripping solution, when nonylphenol is present in the loaded organic solution during the stripping step. The nonylphenol can be added to the organic extracting solution anytime prior to the stripping step. For operational simplicity, it is contemplated to add the nonylphenol to the organic extracted solution prior to the extraction of molybdenum from the aqueous, molybdenum-bearing solution. However, the nonylphenol can be added to the organic extractant solution at any time during the extraction of the aqueous solution, or it can be added to the loaded organic solution which has been separated from the aqueous raffinate. If the nonylphenol is added to the mixed phases during the extraction of molybdenum from the aqueous solution, it reports to the organic portion of the mixed phases. Irrespective of the manner of adding nonylphenyl to the organic solution, the only critical requirement is that a sufficient amount of nonylphenol be present in the loaded organic solution during the stripping step to enhance the stripping characteristics of the aqueous ammonium hydroxide solution, i.e. markedly increase the efficiency of the aqueous solution to strip molybdenum from the organic solution. Generally, the organic extracting solution to which the nonylphenol has been added comprises, on a volume basis, from about 2% to about 50% alpha-hyroxy oxime, and from about 1% to about 20% nonylphenol. Preferably, the organic extractant solution contains from about 2% to about 10% alpha-hydroxy oxime and from about 1% to about 3% nonylphenol.

The aqueous stripping solution contains from about 1% to about 30% ammonium hydroxide, preferably from about 5% to about 10%. The volume ratio of the organic phase and the aqueous stripping solution can be varied over wide limits. Generally, the ratio will be in the range of about 1:100 to 100:1, preferably in the range of about 1:10 to 10:1. Contact times between the aqueous stripping phase and the organic phase can also vary over wide limits. Generally, contact times of from about 5 minutes to 10 minutes are sufficient for stripping essentially all the molybdenum values from the organic phase.

Following the stripping step, the aqueous, molybdenum-bearing solution is separated from the organic solution by virtue of their immiscibility, and the organic solution can be recycled as the organic extractant solution in the extracting step. Molybdenum is recovered from the aqueous stripping solution by conventional procedures. For example, molybdenum can be precipitated from the aqueous solution as a sulfide by first acidifying the solution and then treating the solution with sodium sulfide, or molybdenum can be precipitated as calcium molybdate or ammonium molybdate by treating the strip solution with lime or ammonia, respectively.

When molybdenum is being recovered from an aqueous solution in which at least a portion of the molybdenum is present in a lower oxidation state, e.g. 2 or 3, it has been found advantageous to subject the aqueous solution to an oxidation treatment prior to contacting the aqueous solution with the organic extractant. Molybdenum species present in the aqueous solution in a lower oxidation state tend to form emulsion products at the interface between the aqueous and organic phases, thereby reducing the efficiency of the extraction. Oxidation of these species to a higher oxidation state prior to the extraction step averts the formation of the emulsion products so that the maximum extraction efficiency is achieved.

The oxidation is accomplished by treating the molybdenum-bearing, aqueous solution with an oxidizing agent such as chlorine or hydrogen peroxide. Sufficient chlorine or hydrogen peroxide is added to the solution to raise the EMF of the solution to a value within the range of about 850 to 1150 millivolts.

The process of this invention can be used to recover molybdenum values from acidic aqueous solutions obtained from various sources. The process has particular advantages in selectively recovering molybdenum values from acidic leach liquors and scrubber solutions which contain other dissolved metals, such as copper, arsenic, iron, bismuth, antimony, tin, and lead in addition to the molybdenum.

The invention will be further described with reference to the following examples; however, the examples are intended to illustrate the invention and are not to be construed to limit the scope of the invention.

EXAMPLE 1

A series of tests was performed using a laboratory-scale solvent extraction circuit in which aqueous solutions containing molybdenum values were contacted with organic extractant solutions containing an alpha-hydroxy oxime. The aqueous solutions were obtained from gas scrubbing systems used in cleaning gases from a copper reverberatory furnace. These solutions contained, by weight from about 0.12% to about 0.045% molybdenum, about 0.15% to about 0.3% copper, about 0.1% to about 0.2% arsenic, about 0.005% to about 0.01% bismuth, about 0.065% to about 0.13% iron, about 0.0014% to about 0.0028% antimony, about 0.003% to about 0.005% tin, and about 0.0004% to about 0.0005% lead.

In one set of tests, the aqueous, molybdenum-bearing solutions were treated with chlorine to oxidize the solutions to an EMF range of about 850 to 1150 millivolts, and the pH of each of the solutions was then adjusted to a value less than 2. The solutions were then subjected to extraction with an organic extractant solution comprising 2% nonylphenol, 6% of a commercially available alpha-hydroxy oxime sold under the trade name LIX 63 by General Mills Chemical, Inc., and 92% of Napoleum 470, a hydrocarbon solvent sold by Kerr-McGee Corp. The amount of molybdenum extracted from the aqueous phase was consistently within the range of 98 to 99% of the total molybdenum therein. Essentially all the other metal values in the aqueous solution were rejected by the organic extraction solution and, thus, remained in the aqueous raffinate following the extraction step. The molybdenum-bearing organic solutions were readily separated from the aqueous raffinate by decantation.

The molybdenum-bearing organic solutions were then contacted with an aqueous stripping solution which contained about 10% by weight ammonium hydroxide. The amount of molybdenum stripped from the organic solution was consistently within the range of about 85% to about 95% of the total molybdenum in the organic solution.

Molybdenum was recovered from the aqueous strip solution by evaporation to complete dryness, or by partial evaporation of the solution followed by crystallization of a molybdenum salt therefrom. In either case, the purity of the molybdenum product obtained was comparable to the purity of commercial, reagent grade ammonium molybdate.

In a second set of tests, the aqueous, molybdenum-bearing solutions were not treated with chlorine or any other oxidizing agent prior to the extraction step. The EMF of each of these solutions was about 370, indicating that some of the molybdenum dissolved therein was present in one of its lower oxidation states, e.g. 2 or 3. As these solutions were being extracted, a "mung" formed at the interface of the aqueous-organic phases, and only about 90% of the molybdenum in the aqueous solutions was extracted therefrom. The "mung" was determined to be an emulsion product of the molybdenum species having a lower oxidation state. By subjecting the starting solutions to an oxidizing step, as in the first series of tests, the "mung" formation is averted and the efficiency of the molybdenum extraction is increased to the range of about 98% to 99% as shown in the first set of tests.

EXAMPLE 2

Another series of tests was made using the procedure described for the first set of tests in Example 1, with the sole exception that the organic extraction solution contained no nonylphenol (nor was there any nonylphenol added to the organic extraction solution at any point in the test).

The efficiencies of the extraction of molybdenum values from the aqueous feed solutions were essentially identical to those of Example 1. However, the amounts of molybdenum values which were stripped from the organic solution with the ammonium hydroxide stripping solution were far less than in Example 1. Without nonylphenol being present in the organic solution being stripped, only about 7% of the molybdenum values were transferred to the aqueous stripping solution. The remaining molybdenum remained in the organic solution.

EXAMPLE 3

Aqueous, molybdenum-bearing solutions substantially the same as those in Example 1 were separated into distinct portions. The pH of each of the portions was adjusted to a set value between about 0.8 and about 2.5. Each portion was then subjected to test procedures similar to those described for the first set of tests in Example 1.

The results of the extraction step are shown in the following Table:

| pH | % Molybdenum Extracted | % Copper Extracted |
|---|---|---|
| 0.8 | 99.9 | 0.05 |
| 1.4 | 90.2 | 0.05 |
| 1.7 | 81.6 | 0.10 |
| 2.2 | 78.9 | 0.96 |
| 2.5 | 78.0 | 2.2 |

It can be seen that at a pH of 2 or less the coextraction of copper is essentially nil. The other metal values contained in the aqueous solution were also essentially completely rejected by the organic extracting solution when the pH of the aqueous solutions being extracted was adjusted to a value of about 2 or less.

We claim:
1. A method of selectively recovering dissolved molybdenum values from an aqueous solution containing, in addition to said dissolved molybdenum values, at least one other dissolved metal selected from the group consisting of arsenic, bismuth, copper, iron, antimony, tin, and lead, said method comprising adjusting the pH of the aqueous molybdenum-bearing solution to about 2.0 or less; contacting the pH-adjusted, molybdenum-bearing, aqueous solution with an organic extracting solution comprising a hydrocarbon solvent containing a sufficient amount of alpha-hydroxy oxime to selectively extract said molybdenum values from said aqueous solution; separating the loaded organic extracting solution containing said molybdenum values from the aqueous raffinate; stripping said molybdenum values from the organic extracting solution with an aqueous stripping solution containing ammonium hydroxide; adding nonylphenol to the organic extracting solution prior to said stripping thereof, so that a sufficient amount of nonylphenol is present in the organic extracting solution during the stripping step to increase the efficiency of the aqueous ammonium hydroxide solution in stripping molybdenum values from the organic solution; and recovering the molybdenum values from the aqueous stripping solution.

2. A method in accordance with claim 1, wherein the nonylphenol is added to the loaded organic extracting solution which has been separated from the aqueous raffinate.

3. A method in accordance with claim 1, wherein the nonylphenol is added to the mixed phases during the contact between the organic extracting solution and the molybdenum-bearing, aqueous solution, whereby the nonylphenol reports to the organic portion of the mixture comprising the organic extracting solution.

4. A method in accordance with claim 1, wherein the nonylphenol is added to the organic extracting solution prior to the extraction of molybdenum from the aqueous solution.

5. A method in accordance with claim 1, wherein the dissolved molybdenum values present in a low oxidation state in said aqueous solution are oxidized to a higher oxidation state prior to contacting the aqueous solution with the organic extracting solution.

6. A method in accordance with claim 5, wherein chlorine is introduced into said aqueous solution to oxidize the molybdenum values.

7. A method in accordance with claim 5, wherein hydrogen peroxide is introduced into said aqueous solution to oxidize the molybdenum values.

8. A method in accordance with claim 1, wherein the organic extracting solution to which said nonylphenol has been added comprises, on a volume basis, from about 2% to about 50% alpha-hydroxy oxime, from about 1% to about 20% nonylphenol.

9. A method in accordance with claim 8, wherein said aqueous stripping solution contains from about 1% to about 30% ammonium hydroxide.

10. A method in accordance with claim 8, wherein said organic extracting solution to which said nonylphenol has been added contains from about 2% to about 10% alpha-hydroxy oxime, from about 1% to about 3% nonylphenol, and said aqueous stripping solution contains from about 5% to about 10% ammonium hydroxide.

* * * * *